US009401890B2

(12) United States Patent
Nieminen

(10) Patent No.: US 9,401,890 B2
(45) Date of Patent: Jul. 26, 2016

(54) METHOD AND A NETWORK ELEMENT FOR CONTENT BASED ADDRESSING IN A DATA TRANSFER NETWORK

(71) Applicant: TELLABS OY, Espoo (FI)

(72) Inventor: Juha-Petteri Nieminen, Espoo (FI)

(73) Assignee: CORIANT OY, Espoo (FI)

( * ) Notice: Subject to any disclaimer, the term of this patent is extended or adjusted under 35 U.S.C. 154(b) by 372 days.

(21) Appl. No.: 13/783,896

(22) Filed: Mar. 4, 2013

(65) Prior Publication Data

US 2013/0262701 A1    Oct. 3, 2013

(30) Foreign Application Priority Data

Mar. 30, 2012    (FI) .................................... 20125366

(51) Int. Cl.
*H04L 29/08* (2006.01)
*H04L 29/12* (2006.01)

(52) U.S. Cl.
CPC .......... *H04L 61/2503* (2013.01); *H04L 67/327* (2013.01)

(58) Field of Classification Search
CPC combination set(s) only.
See application file for complete search history.

(56) References Cited

U.S. PATENT DOCUMENTS

| 6,757,742 B1* | 6/2004 | Viswanath ..................... 709/246 |
| 7,978,631 B1 | 7/2011 | Abdelaziz et al. |
| 2007/0136279 A1* | 6/2007 | Zhou et al. ........................ 707/6 |
| 2008/0005141 A1* | 1/2008 | Zheng et al. .................. 707/101 |
| 2009/0234892 A1* | 9/2009 | Anglin et al. ................. 707/201 |
| 2009/0274154 A1* | 11/2009 | Kopelman et al. ....... 370/395.32 |
| 2010/0166174 A1* | 7/2010 | Ghouti et al. ................... 380/28 |
| 2010/0217904 A1* | 8/2010 | Sakamoto et al. ............ 710/117 |
| 2011/0035437 A1 | 2/2011 | Toumura |

OTHER PUBLICATIONS

Finnish Search Report, dated Oct. 18, 2012, from corresponding Finnish application.

* cited by examiner

*Primary Examiner* — Larry Donaghue
(74) *Attorney, Agent, or Firm* — Young & Thompson

(57) ABSTRACT

In a content addressable network, a hash result of a data item, which is a part of or relating to an entity to be accessed via the network, constitutes (401, 402) at least a part of an L3 network layer, e.g. IP, destination address and/or a protocol layer below L3, e.g. Ethernet, destination address of a protocol data unit, e.g. a data packet, frame, or cell. The entity to be accessed can be e.g. a data file, a hierarchical data structure, or a process to be controlled via the network. There is no need to retrieve e.g. an Ethernet address, or e.g. an IP-address, on the basis of the hash result of the data item, because the hash result itself is used as the address. Hence, in the content addressable network, the step for address retrieval on the basis of the hash result becomes needless.

29 Claims, 5 Drawing Sheets

METHOD AND A NETWORK ELEMENT FOR CONTENT BASED ADDRESSING IN A DATA TRANSFER NETWORK

FIELD OF THE INVENTION

The invention relates generally to content based addressing in a data transfer network. More particularly, the invention relates to a method and a network element for providing content based addressing in a data transfer network. Furthermore, the invention relates to computer programs for providing content based addressing in a data transfer network.

BACKGROUND

Nowadays there is often a need to build massively scalable distributed systems such as, for example: distributed databases that support petabytes of data and terabits per second read and write rates, cloud computing systems that balance load between geographical locations and server hardware, and content delivery networks that automatically find a suitable delivery point. Publication U.S. Pat. No. 7,978,631 describes a method, an apparatus, and a system for providing a data transfer network using an identification and communication mechanism. A data item that is a part of or related to an entity that is wanted to be accessible via the data transfer network is used to generate a unique identifier using a hash function. The accessible entity can be, for example, a data file, a data element of a hierarchical data structure, a process to be controlled via the data transfer network, or a device to be controlled via the data transfer network. The above-mentioned data item can comprise, for example, a name of a data file, a combination of a name of a hierarchical data structure and a name of an element of the data structure, identifier of a process or a patch job, and/or a name of a network element or a device connected to a network element. An advertisement message that specifies at least one address associated with the accessible entity is provided with the unique identifier. The advertisement message is broadcasted to the network elements of the data transfer network. A protocol data unit "PDU", e.g. a data packet or a data frame, is addressed to the accessible entity in the data transfer network by retrieving, with the aid of the unique identifier, an address associated with accessible entity. Then, the protocol data unit is routed to the address associated with the accessible entity using an Open System Interconnection "OSI" Level 2 data link layer protocol, e.g. Ethernet, and/or a higher level protocol, e.g. an OSI Level 3 network layer protocol, e.g. Internet Protocol "IP". The associations between the unique identifiers of the accessible entities and the addresses related to the accessible entities provide content based addressability which e.g. facilitates arranging scalable distributed databases, but maintaining these associations requires resources.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the invention, there is provided new methods for providing content based addressability in a data transfer network. The first one of the methods according to the invention comprises:

directing a first hash-function to a first data item that is a part of or related to an entity to be accessed via a data transfer network, transmitting, from a first network element, a protocol data unit to the data transfer network so as to access to the entity via the data transfer network, the protocol data unit comprising at least one of the following destination addresses: an Open System Interconnection "OSI" Level 3 network layer destination address, a destination address related to a protocol layer below the OSI Level 3 network layer, and setting the result of the first hash-function to be at least a part of at least one of the following: the OSI Level 3 network layer destination address, the destination address related to the protocol layer below the OSI Level 3 network layer.

The protocol data unit can be, for example but not necessarily, an Ethernet data frame, an Internet Protocol "IP" data packet, or an Ethernet data frame containing an IP data packet. In the first mentioned case, the protocol data unit comprises the OSI Level 2 data link layer destination address which represents the destination address related to the protocol layer below the OSI Level 3 network layer. In the second mentioned case, the protocol data unit comprises the OSI Level 3 network layer destination address. In the last mentioned case, the protocol data unit comprises both the OSI Level 2 data link layer destination address and the OSI Level 3 network layer destination address. It is also possible that the protocol data unit is a MultiProtocol Label Switching "MPLS" data frame. The MPLS is sometimes regarded as an OSI Level 2.5 layer protocol and sometimes as an OSI Level 3 network layer protocol. Hence, an MPLS label indicating the forwarding direction can be seen to represent either an OSI Level 3 network layer destination address or a destination address related to a protocol layer below the OSI Level 3 network layer.

Hereinafter in this document, the abbreviated notations "L3" and "L2" are used to mean the OSI Level 3 network layer and the OSI Level 2 data link layer, respectively. Notation "below L3" is used to mean any OSI protocol layer below the OSI Level 3 network layer. For the sake of clarity, it is mentioned that the "below L3" includes L2.

The other one of the methods according to the invention comprises:

receiving, at a second network element, the protocol data unit from the data transfer network, comparing at least a part of the destination address of the received protocol data unit with first hash results each of which being a result of the first hash-function directed to a data item that is a part of or related to a corresponding one of the entities accessible via the data transfer network, and controlling, in response to a match between the destination address and at least one of the first hash results, the second network element to provide access to the entity related to the first hash result matching with the destination address.

The second network element can provide access to the entity for example by transmitting reply protocol data units containing data that may represent the accessible entity, or by controlling according to instructions contained by the protocol data unit a process that may represent the accessible entity, or by forwarding the protocol data unit to another network device which has a more direct access to the entity to be accessed.

In the methods described above, the hash result is used as at least a part of the L3 destination address and/or the below L3 destination address of the protocol data unit. The use of the hash result as at least a part of the L3 and/or below L3 destination address makes it possible to construct routing and forwarding tables or other corresponding protocol databases so that there is a logical network of entities which are, in physical network elements, addressable by the hash results. When, for example, a new accessible entity is added to the data transfer network, a corresponding hash result can be advertised to network elements of the data transfer network. As the hash results itself constitute at least a part of the destination addresses and preferably also at least a part of source addresses, there is no need, in advantageous embodiments of the invention, to maintain associations between the hash results and e.g. Ethernet and/or Internet Protocol addresses of network elements containing or related to the accessible entities. In a special case, where there is a ring-shaped data transfer topology and there is no need to select an optimal transfer direction in the ring, it is sufficient that each network element knows the accessible entities contained by or related to this network element so that the network element can pick an appropriate protocol data unit from the ring.

In accordance with the second aspect of the invention, there is provided a new network element that is suitable for operating as a source network element. The network element comprises a data interface for connecting to a data transfer network, and a processor configured to:
  direct a first hash-function to a first data item that is a part of or related to an entity to be accessed via the data transfer network,
  control the data interface to transmit a protocol data unit to the data transfer network so as to access to the entity, the protocol data unit comprising at least one of the following destination addresses: an L3 network layer destination address, a destination address related to a protocol layer below the L3 network layer,
  set a result of the first hash-function to be at least a part of at least one of the following: the L3 network layer destination address, the destination address related to the protocol layer below the L3 network layer, and
  set data that is a part of or related to the entity to be accessed to be at least a part of payload data of the protocol data unit.

In accordance with the third aspect of the invention, there is provided a new network element that is suitable for operating as a destination network element. The network element comprises a data interface for receiving a protocol data unit from a data transfer network, and a processor configured to:
  compare at least a part of a destination address of the received protocol data unit with first hash results each of which being a result of a first hash-function directed to a data item that is a part of or related to a corresponding one of entities accessible via the data transfer network, the destination address being one of the following: an L3 network layer destination address, a destination address related to a protocol layer below the L3 network layer, and
  control, in response to a match between the destination address and at least one of the first hash results, the network element to provide access to the entity related to the first hash result matching with the destination address.

In accordance with the fourth aspect of the invention, there is provided a new computer program for controlling a network element that is suitable for operating as a source network element. The computer program comprises computer executable instructions for controlling a programmable processor to:
  direct a first hash-function to a first data item that is a part of or related to an entity to be accessed via a data transfer network,
  control a data interface of the network element to transmit a protocol data unit to the data transfer network so as to access to the entity via the data transfer network, the protocol data unit comprising at least one of the following destination addresses: an L3 network layer destination address, a destination address related to a protocol layer below the L3 network layer,
  set the result of the first hash-function to be at least a part of at least one of the following: the L3 network layer destination address, the destination address related to the protocol layer below the L3 network layer, and
  set data that is a part of or related to the entity to be accessed to be at least a part of payload data of the protocol data unit.

In accordance with the fifth aspect of the invention, there is provided a new computer program for controlling a network element that is suitable for operating as a destination network element. The computer program comprises computer executable instructions for controlling a programmable processor to:
  compare at least a part of a destination address of the received protocol data unit with first hash results each of which being a result of a first hash-function directed to a data item that is a part of or related to a corresponding one of entities accessible via the data transfer network, the destination address being one of the following: an L3 network layer destination address, a destination address related to a protocol layer below the L3 network layer, and
  control, in response to a match between the destination address and at least one of the first hash results, the network element to provide access to the entity related to the first hash result matching with the destination address.

In accordance with the sixth aspect of the invention, there is provided a new computer program product. The computer program product comprises a non-volatile computer readable medium, e.g. a compact disc "CD", encoded with a computer program according to the fourth aspect of the invention and/or a computer program according to the fifth aspect of the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in dependent claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
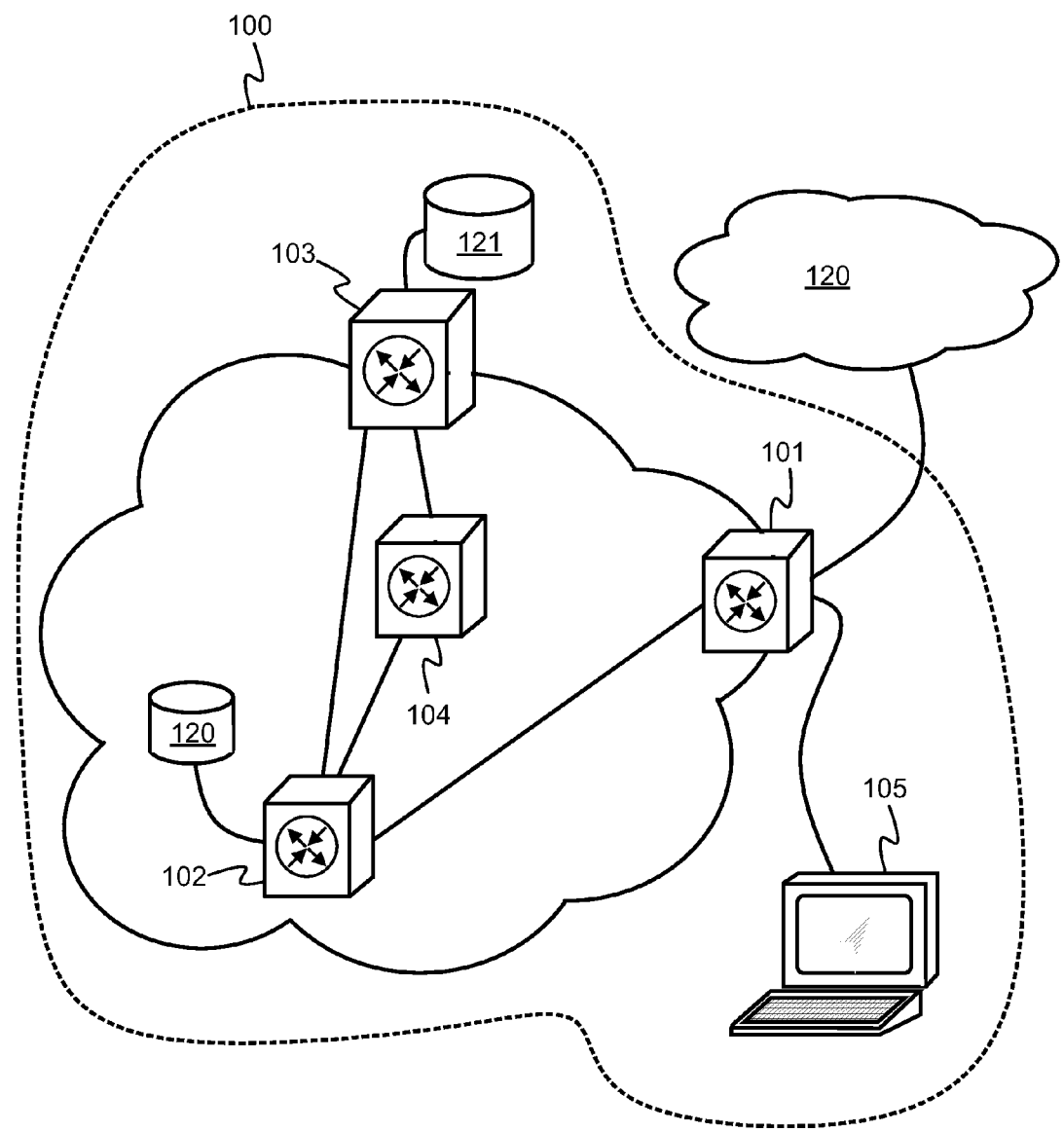
FIG. 1 shows a schematic illustration of a data transfer network comprising network elements according to exemplifying embodiments of the invention.

FIG. 1 shows a schematic illustration of a data transfer network 100 that comprises network elements 101, 102, 103, and 104 according to exemplifying embodiments of the invention. The network elements 101-104 are mutually interconnected with data transfer links as illustrated by FIG. 1. The network elements may be e.g. IP (Internet Protocol) routers, multiprotocol label switching "MPLS" nodes, and/or Ethernet switches. Each network element may consist of a single apparatus or a combination of a plurality of apparatuses. In the exemplifying case illustrated in FIG. 1, a terminal device 105 is connected to the network element 101 and external memories 120 and 121 are connected to the network elements 102 and 103, respectively. For the sake of illustrative purposes, we assume that the network element 101 is suitable for operating as a source network element which transmits a protocol data unit "PDU" to the data transfer network so as to provide e.g. a user of the terminal device 105 with access to an entity maintained in the data transfer network. The protocol data unit can be, for example, an IP data packet or an Ethernet data frame. We also assume that the network element 103 is suitable for operating as a destination network element which receives the above-mentioned protocol data unit and provides e.g. the user of the terminal device 105 with the access to the entity. We also assume that the network elements 102 and 104 are suitable for forwarding the above-mentioned protocol data unit to the network element 103 either directly or via other network elements of the data transfer network.

The above-mentioned accessible entity maintained in the data transfer network can be, for example but not necessarily:
- a data file,
- a data element of a hierarchical data structure,
- a data item representing dynamic data such as e.g. measured temperature,
- a process or a patch job that is controlled and/or monitored via the data transfer network, or
- a network element or another device that is used, controlled, and/or monitored via the data transfer network.

Providing access to the entity may mean, for example but not necessarily:
- transferring a data file from the network element 103 to the terminal device 105,
- controlling a process or a patch job run by the network element 103 or by a device connected to the network element 103 on the basis of data carried by the protocol data unit transferred from the network element 101 to the network element 103,
- transferring status information about the process from the network element 103 to the terminal device 105,
- transferring a data item representing dynamic data, e.g. measured temperature, from the network element 103 to the terminal device 105,
- navigating in a hierarchical data structure on the basis of data carried by the protocol data unit transferred from the network element 101 to the network element 103,
- transferring a data element of the hierarchical data structure from the network element 103 to the terminal device 105,
- transferring, from the network element 103 to the terminal device 105, a data item indicating status of the network element 103 or a device connected to the network element, and/or
- using, controlling, and/or monitoring the network element 103 or a device connected to the network element on the basis of data carried by the protocol data unit transferred from the network element 101 to the network element 103.

Figure 3:
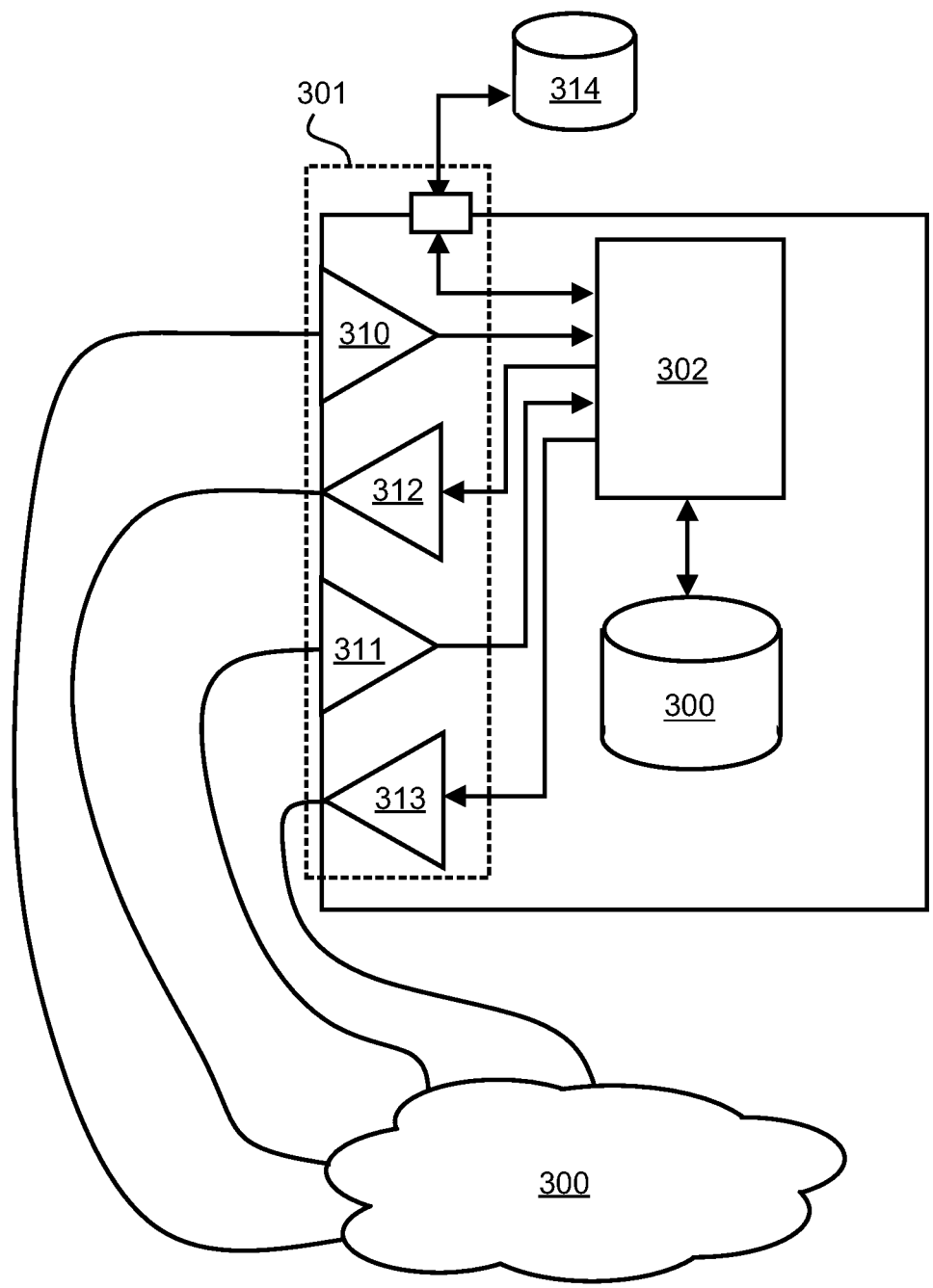
FIG. 3 shows a schematic illustration of network elements according to exemplifying embodiments of the invention.

FIG. 3 shows a schematic illustration of network elements according to exemplifying embodiments of the invention. First, we consider a case where FIG. 3 represents the network element 101 shown in FIG. 1. The network element comprises a data interface 301 suitable for connecting to a data transfer network 300. The data interface comprises one or more ingress ports 310 and 311, and one or more egress ports 312 and 313. Furthermore, the data interface may comprise data ports for connecting to an external memory 314 or to other external devices. The network element comprises a processor 302 that is configured to control the data interface 301 to transmit a protocol data unit to the data transfer network so as to access to an entity maintained in the data transfer network. The processor 302 is configured direct a first hash-function to a first data item that is a part of or related to the entity to be accessed via the data transfer network. The first data item can be, for example but not necessarily:
- a name or another identifier of a data file,
- a name or another identifier of a hierarchical data structure together with an identifier of a data element of the hierarchical data structure,
- a name of another identifier of dynamic data e.g. measured temperature,
- a name of another identifier of a process or a patch job that is controlled and/or monitored via the data transfer network, or
- a name of another identifier of a network element or another device that is used, controlled, and/or monitored via the data transfer network.

The first hash-function can be, for example, the Secure Hash Algorithm 1 "SHA-1", SHA-2, or SHA-3 published by the National Institute of Standards and Technology "NIST" as a U.S. Federal Information Processing Standard "FIPS".

The processor 302 is configured to set the result of the first hash-function to be at least a part of an Open System Interconnection "OSI" L3 network layer destination address of a protocol data unit and/or at least a part of a destination address related to a protocol layer below the OSI L3 network layer. The destination address related to the protocol layer below the OSI L3 network layer, "below L3 destination address", can be for example an OSI L2 link layer destination address which, in turn, can be for example the destination address of an Ethernet frame. The L3 network layer destination address can be, for example, the destination address of an IP data packet. It should be noted that the protocol data unit does not necessarily comprise both the L3 and the below L3 destination addresses. The use of the hash result as at least a part of the L3 and/or below L3 destination address makes it possible to construct routing and forwarding tables or other corresponding protocol databases so that there is a logical network of the entities which are, in the network elements 101-104, addressable by the hash results. When, for example, a new accessible entity is added to the data transfer network, a corresponding hash result can be advertised to network elements of the data transfer network.

In a network element according to an exemplifying embodiment of the invention, the processor 302 is configured to direct a second hash-function to a second data item that is a part of or related to the entity to be accessed, and set the result of the second hash-function to be another part of the destination address constituted partly by the result of the first hash-function. This makes possible to implement hierarchical addressing for example in a case where the entity to be accessed is a hierarchical structure, e.g. a hierarchical data structure. The first data item can be related to a higher hierarchy level than the second data item. For example, the hierarchical data structure can be: "customers of company A"—"customers of company A living in country B"—"customers of company A, living in country B, and belonging to an age group C". In this case, the L3 and/or below L3 destination address can comprise a first hash result $H_1$ obtained by directing the first-hash function to a bit string representing the phrase "customers of company A", a second hash result $H_2$ obtained by directing the second-hash function to a bit string representing the phrase "country B", and a third hash result $H_3$ obtained by directing a third-hash function to a bit string representing the phrase "age group C". The routing based on this L3 and/or below L3 destination address can be hierarchical so that the protocol data unit is forwarded to a certain area of the data transfer network on the basis of $H_1$, and, inside this area, the protocol data unit is forwarded to a certain sub-area on the basis of $H_2$, and inside this sub-area, to a certain network element on the basis of $H_3$. Therefore, it is possible to construct scalable databases for hierarchical data structures so that different branches of the hierarchical structure can be located in different areas of the data transfer network. The above-mentioned first, second, and third hash-functions can be the same hash-function or two or all of them can be mutually different hash-functions.

In a network element according to an exemplifying embodiment of the invention, the processor 302 is configured to set a data item that is a part of or related to the entity to be accessed to be at least a part of payload data of the protocol data unit. This data item can be used, at a receiving network element, for checking whether a hash collision has taken place. The data item can comprise for example one or more of the bit strings, e.g. a file name, used as the input data for obtaining the one or more hash results which constitute at least a part of the L3 and/or below L3 destination address. As the hash-function decreases information, there is a risk that also another bit string gives a same hash result. Thus, a match between the destination address and a hash result at a receiving network element does not guarantee that the desired entity is available at the receiving network element. The receiving network element can be configured to compare the above-mentioned data item with bit strings representing the entities that are available at the receiving network element. If the destination address matches with a hash result but the data item does not match with any of the said bit strings, a hash collision has taken place and the protocol data unit has to be forwarded to another network element. However, on the other hand, a mismatch between the destination address and the hash results guarantees that the desired entity is not available at the receiving network element. Therefore, the more time consuming inspection of the data item carried in the payload data is needed only in situations where the destination address matches with one of the hash results at the receiving network element.

In a network element according to an exemplifying embodiment of the invention, the processor 302 is configured to direct a hash-function to the above-mentioned data item that is a part of or related to the entity to be accessed, and to set the result of this hash-function to be at least a part of the payload data of the protocol data unit. The above-mentioned data item can be set, but not necessarily, to be another part of the payload data. This hash-function is such that its result contains more bits than the hash result used in the destination address. Thus, the hash result that is carried in the payload data contains more information than the hash result used in the destination address, and therefore the hash result carried in the payload data can used for detecting hash collisions in the destination address.

In a network element according to an exemplifying embodiment of the invention, the processor 302 is configured to direct a hash-function to a data item identifying the network element, and to set a result of this hash-function to be at least a part of at least one of the following:
  an OSI L3 network layer source address of the protocol data unit to be transmitted to the data transfer network so as to access to the entity to be accessed,
  an OSI protocol layer below L3, e.g. OSI L2 data link layer, source address of the protocol data unit.

The network element itself is also an entity accessible via the data transfer network, and thus the hash result of the data item identifying the network element can be used as the L3 and/or the below L3 destination address of the network element.

In a network element according to an exemplifying embodiment of the invention, the processor 302 is configured to select one or more egress ports from among the egress ports 312 and 313 of the network element on the basis of the L3 or the below L3 destination address containing the hash result. The processor 302 is configured to control the selected one or more egress ports to transmit the protocol data unit to the data transfer network. The selection of the egress port can be based on a routing table which associates the hash results with the appropriate egress ports. This routing table can be constructed on the basis of advertising messages which are sent to the network element when changes take place among the accessible entities. The network elements 102 and 104 shown in FIG. 1 can be network elements according to this embodiment of the invention.

In a network element according to an exemplifying embodiment of the invention, the processor 302 shown in FIG. 3 is configured to read a data item from a protocol data unit that is received at the network element from an external data transfer system 120 illustrated by a cloud in FIG. 1. The processor is configured to direct the first hash-function to the read data item, and to set the result of the first hash-function to be at least a part of an OSI L3 network layer destination address of the protocol data unit and/or at least a part of a destination address related to a protocol layer below the OSI L3 network layer. The processor is configured to forward the protocol data unit to the data transfer network 100 shown in FIG. 1. The external data transfer system can be for example the public Internet. The network element 101 shown in FIG. 1 can operate as a gateway between the data transfer network 100 and the external data transfer system 120. The network element 101*n* can be configured to replace, for example, an ordinary IP- or Ethernet address with the hash result obtained by directing the first hash-function to the data item read from the protocol data unit received from the external data transfer system 120.

The processor 302 of the network element shown in FIG. 3 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Next we consider a case where FIG. 3 illustrates the network element 103 shown in FIG. 1. The network element comprises a data interface 301 for receiving a protocol data unit from the data transfer network and a processor 302 that is configured to:

compare at least a part of a destination address of the received protocol data unit with first hash results each of which being a result of a first hash-function directed to a first data item that is a part of or related to a corresponding one of the entities accessible via the data transfer network, the destination address being one of the following: an OSI L3 network layer destination address, a destination address related to a protocol layer below the OSI L3 network layer, and control, in response to a match between the destination address and at least one of the first hash results, the network element to provide access to the entity related to the first hash result matching with the destination address.

In a network element according to an exemplifying embodiment of the invention, the processor 302 is configured to carry out the following actions in response to the match between the destination address and at least one of the first hash results:

comparing at least a part of the destination address of the received protocol data unit with second hash results each of which being a result of a second hash-function directed to a second data item that is a part of or related to a sub-entity of the entity related to the first hash result matching with the destination address, and controlling, in response to a match between the destination address and at least one of the second hash results, the network element to provide access to the sub-entity related to the second hash result matching with the destination address.

The above-mentioned entity has a hierarchical structure so that the accessible entity comprises several separately accessible sub-entities which, in turn, might comprise separately accessible second order sub-entities, etc.

In a network element according to an exemplifying embodiment of the invention, the processor 302 is configured to compare a data item contained by the payload data of the protocol data unit with a third data item that is a part of or related to the entity to be accessed. The processor 302 is configured to invalidate the match between the destination address and at least one of the first hash results in response to a situation where there is no match between the third data item and the data item contained by the payload data of the protocol data unit. The above-presented comparison can be used for detecting hash collisions in the destination address.

In a network element according to an exemplifying embodiment of the invention, the processor 302 is configured to compare a data item contained by the payload data of the protocol data unit with a third hash result that is a result of a third hash-function directed to a third data item that is a part of or related to the entity to be accessed. The processor 302 is configured to invalidate the match between the destination address and at least one of the first hash results in response to a situation where there is no match between the third hash result and the data item contained by the payload data of the protocol data unit. The result of the third hash-function contains more bits than the result of the first hash-function and thus the above-presented comparison can be used for detecting hash collisions in the destination address.

The above-mentioned third data item can be for example:
a first data item that is the input of the first hash-function,
a second data item that is the input of the second hash-function that can be used when the accessible entity has a hierarchical structure, or
a concatenation of the first and second data items.

In a network element according to an exemplifying embodiment of the invention, the processor 302 is configured to carry out the following actions in response to the match between the destination address and one of the first hash results:

setting at least a part of the entity relating to the matched first hash result to be at least a part of payload data of another protocol data unit, setting the source address of the received protocol data unit to be the destination address of the other protocol data unit, and controlling the data interface to transmit the other protocol data unit to the data transfer network.

The other protocol data unit can contain for example a data file or a part of a data file which is delivered to the network element 101 shown in FIG. 1 in response to a request represented by the protocol data unit transferred from the network element 101 to the network element 103.

In a network element according to an exemplifying embodiment of the invention, the processor 302, FIG. 3, is configured to direct a control action to the entity relating to the matched first hash result. The entity can be for example a process ro a patch job run in the network element 103 or in device connected to the network element 103.

In a network element according to an exemplifying embodiment of the invention, the processor 302 is configured to select at least one egress port from among egress ports of the data interface 301 on the basis of the matched first hash result and to control the selected one or more egress ports to forward the received protocol data unit to the data transfer network. In this case, the network element 103 can operate as a forwarding network element.

Figure 2:
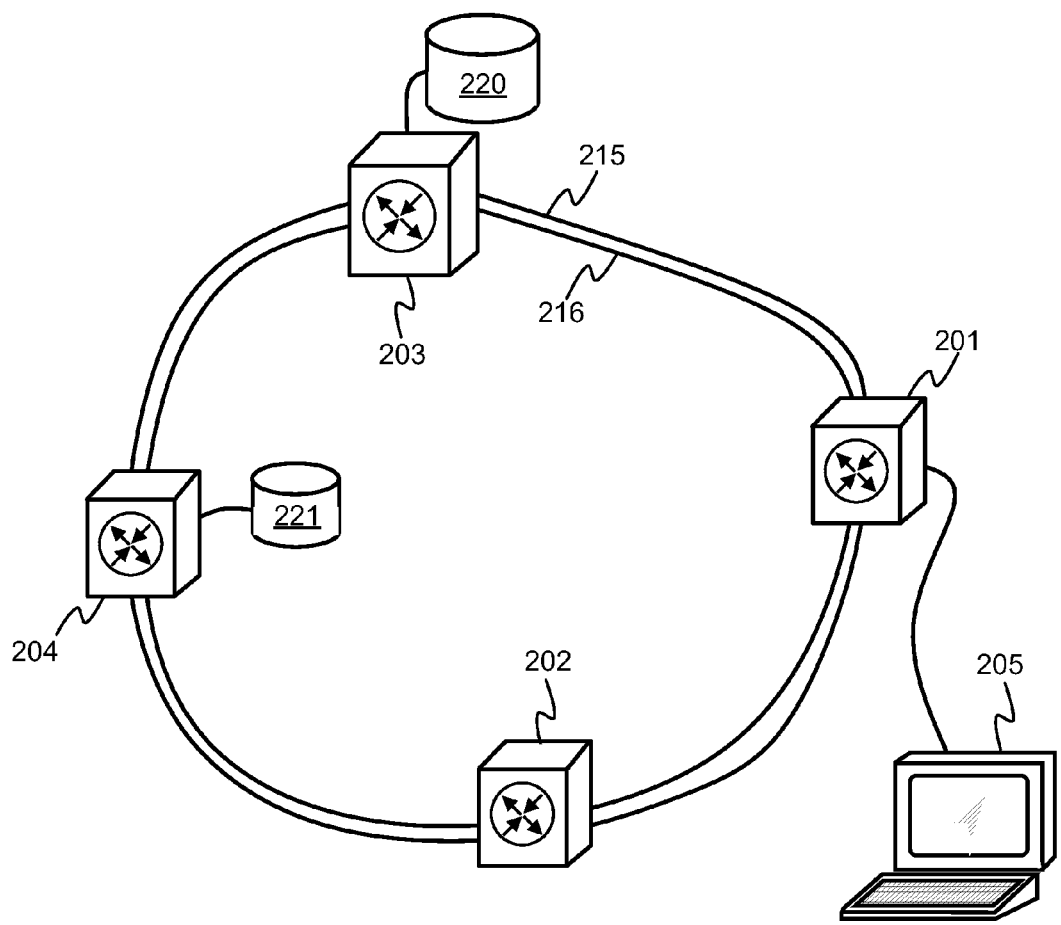
FIG. 2 shows a schematic illustration of a data transfer network comprising network elements according to exemplifying embodiments of the invention.

FIG. 2 shows a schematic illustration of a data transfer network provided with network elements 201, 202, 203, and 204 according to exemplifying embodiments of the invention. The network elements 201-204 are connected with data transfer links to constitute a ring-shaped data transfer topology that comprises two parallel transport rings 215 and 216 as illustrated in FIG. 2. In the exemplifying case illustrated in FIG. 2, a terminal device 205 is connected to the network element 201 and external memories 220 and 221 are connected to the network elements 203 and 204, respectively. The network elements may be e.g. IP (Internet Protocol) routers, multiprotocol label switching "MPLS" nodes, and/or Ethernet switches. Each network element may consist of a single apparatus or a combination of a plurality of apparatuses.

Each of the network elements 201-204 comprises a processor that is configured to operate the network element as a part of the ring-shaped data transfer topology. In a special case where there is no need to select an optimal transfer direction in the ring, e.g. the transfer direction can be the same all the time, it is sufficient that each network element knows the accessible entities contained by or related to this network element so that the network element under consideration can pick an appropriate protocol data unit from the ring. In this case, protocol data units are transmitted to other network elements via a pre-determined egress port. In a case where there are two or more parallel transport rings, such as the transport rings 215 and 216 shown in FIG. 2, there is a pre-determined set of egress ports via which protocol data units are transmitted to other network elements. It is also possible that a network element is configured to select an optimal transmission direction when sending a reply to a protocol data unit sourced by another network element on the basis of the source address of the protocol data unit and routing data which indicates e.g. the hop-counts to the other network elements in the ring. The ring shaped data transfer topology is advantageous from the viewpoint of arranging self-healing and automatic switchover from a faulty network element to a backup network element.

Figure 4A:
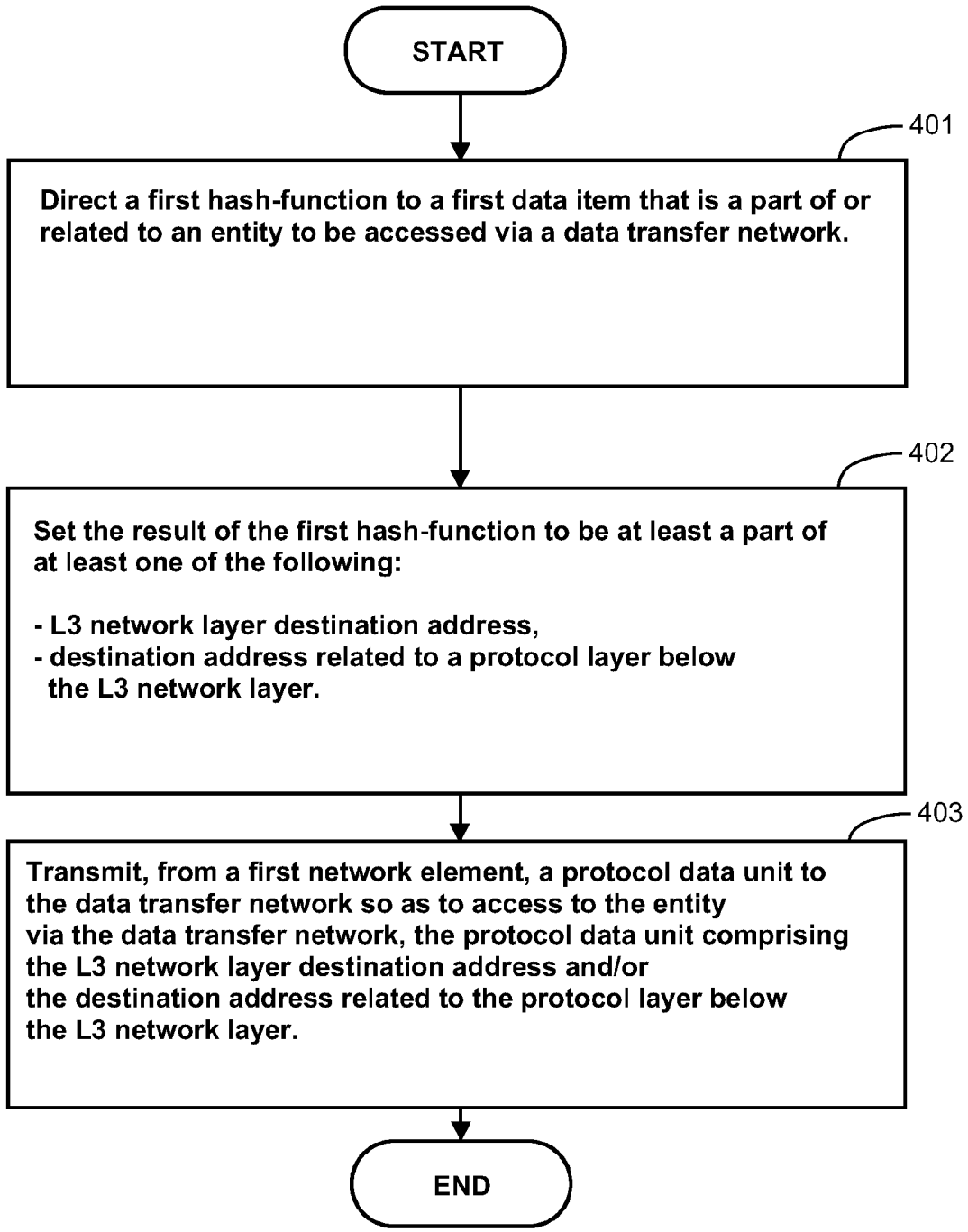
FIGS. 4a and 4b show flow charts of methods according to exemplifying embodiments of the invention for providing content based addressability in a data transfer network.
Figure 4B:
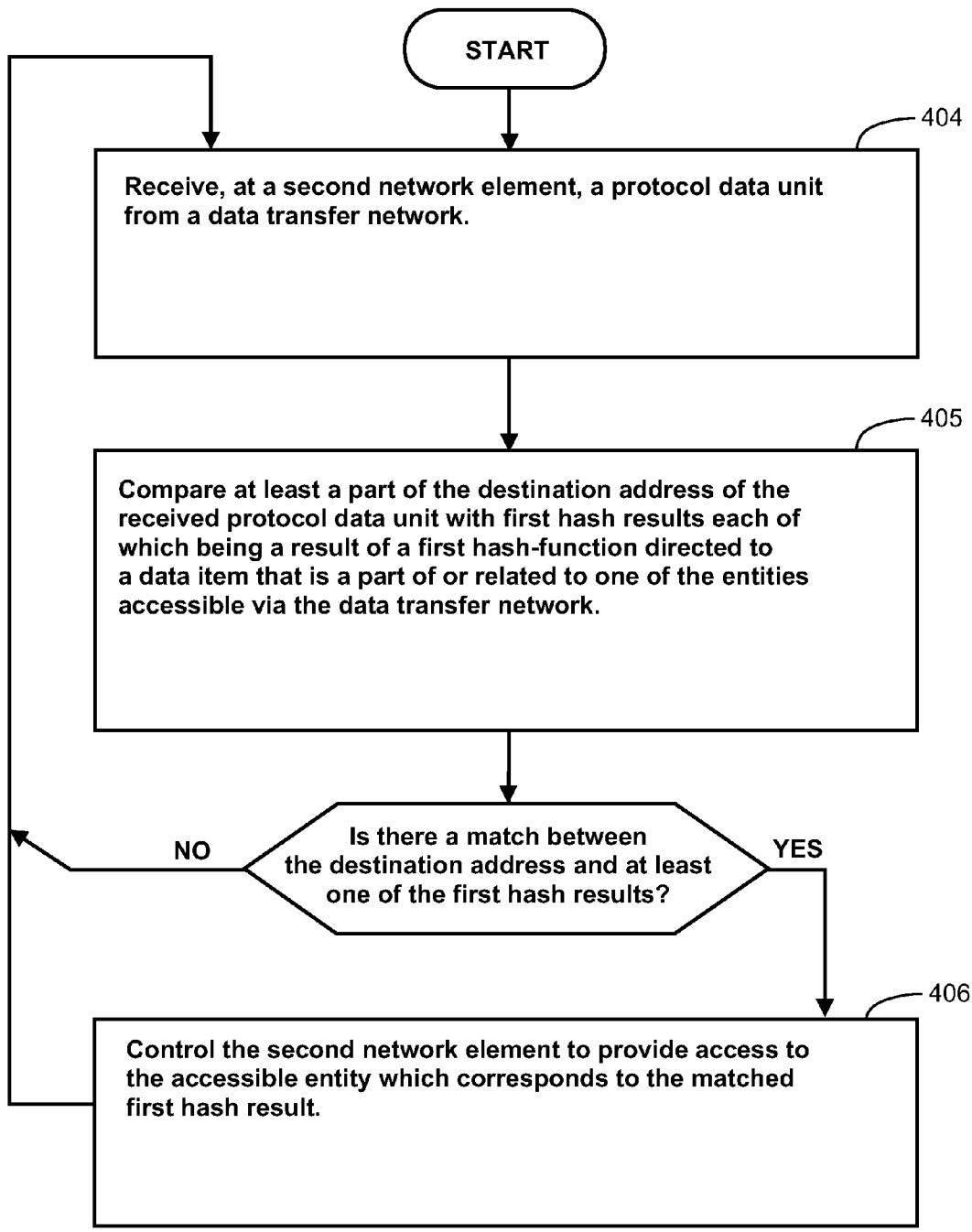

FIGS. 4a and 4b show flow charts of methods according to exemplifying embodiments of the invention for providing content based addressability in a data transfer network. The method illustrated in FIG. 4a comprises the following actions:

action 401: directing a first hash-function to a first data item that is a part of or related to an entity to be accessed via a data transfer network, action 402: setting the result of the first hash-function to be at least a part of at least one of the following destination addresses: an Open system Interconnection "OSI" L3 network layer destination address, a destination address related to a protocol layer below the OSI L3 network layer, and action 403: transmitting, from a first network element, a protocol data unit to the data transfer network so as to access to the entity via the data transfer network, the protocol data unit comprising the L3 network layer destination address and/or the destination address related to the protocol layer below the L3 network layer.

The method illustrated in FIG. 4b comprises the following actions:

action 404: receiving, at a second network element, the protocol data unit from the data transfer network, action 405: comparing at least a part of the destination address of the received protocol data unit with first hash results each of which being a result of the first hash-function directed to a data item that is a part of or related to a corresponding one of the entities accessible via the data transfer network, and action 406: in response to a match between the destination address and at least one of the first hash results, controlling the second network element to provide access to the entity related to the first hash result matching with the destination address.

A method according to an exemplifying embodiment of the invention comprises carrying out the following actions in response to the match between the destination address and at least one of the first hash results:

comparing at least a part of the destination address of the received protocol data unit with second hash results each of which being a result of a second hash-function directed to a second data item that is a part of or related to a sub-entity of the entity related to the first hash result matching with the destination address, and controlling, in response to a match between the destination address and at least one of the second hash results, the network element to provide access to the sub-entity related to the second hash result matching with the destination address.

A method according to an exemplifying embodiment of the invention comprises:

comparing a data item contained by the payload data of the received protocol data unit with a third data item that is a part of or related to the entity to be accessed, and invalidating the match between the destination address and at least one of the first hash results in response to a situation where there is no match between the third data item and the data item contained by the payload data of the received protocol data unit.

A method according to an exemplifying embodiment of the invention comprises:

comparing a data item contained by the payload data of the protocol data unit with a third hash result that is a result of a third hash-function directed to a third data item that is a part of or related to the entity to be accessed, and invalidating the match between the destination address and at least one of the first hash results in response to a situation where there is no match between the third hash result and the data item contained by the payload data of the protocol data unit, the result of the third hash-function containing more bits than the result of the first hash-function.

In a method according to an exemplifying embodiment of the invention, the entity to be accessed via the data transfer network is, for example but not necessarily, one of the following: a data file, a data element of a hierarchical data structure, a process to be controlled via the data transfer network, a device to be controlled via the data transfer network.

A computer program according to an exemplifying embodiment of the invention comprises software modules for controlling a network element that is suitable for operating as a source network element. The software modules comprise computer executable instructions for controlling a programmable processor to:

direct a first hash-function to a first data item that is a part of or related to an entity to be accessed via a data transfer network, control a data interface of the network element to transmit a protocol data unit to the data transfer network so as to access to the entity via the data transfer network, the protocol data unit comprising at least one of the following destination addresses: an L3 network layer destination address, a destination address related to a protocol layer below the L3 network layer, and set the result of the first hash-function to be at least a part of at least one of the following: the L3 network layer destination address, the destination address related to the protocol layer below the L3 network layer.

A computer program according to an exemplifying embodiment of the invention comprises software modules for controlling a network element that is suitable for operating as a destination network element. The software modules comprise computer executable instructions for controlling a programmable processor to:

compare at least a part of a destination address of a protocol data unit with first hash results each of which being a result of a first hash-function directed to a first data item that is a part of or related to a corresponding one of the entities accessible via the data transfer network, the destination address being one of the following: an L3 network layer destination address, a destination address related to a protocol layer below the L3 network layer, and control, in response to a match between the destination address and at least one of the first hash results, the network element to provide access to the entity related to the first hash result matching with the destination address.

The software modules can be e.g. subroutines or functions implemented with a suitable programming language and with a compiler suitable for the programming language and the programmable processor.

A computer program product according to an embodiment of the invention comprises a computer readable medium, e.g. a compact disc ("CD"), encoded with a computer program according to an embodiment of invention.

A signal according to an embodiment of the invention is encoded to carry information defining a computer program according to an embodiment of invention.

The specific examples provided in the description given above should not be construed as limiting the scope and/or the applicability of the appended claims.

What is claimed is:

1. A network element operational as a source network element, the network element comprising:
    a data interface that connects to a data transfer network; and
    a processor configured to:
        control the data interface to transmit a protocol data unit to the data transfer network so as to access an entity maintained in the data transfer network, and
        direct a first hash-function to a first data item that is a part of or related to the entity to be accessed via the data transfer network,
    wherein the protocol data unit comprises at least one of the following destination addresses: an L3 network layer destination address, a destination address related to a protocol layer below the L3 network layer,
    wherein the processor is further configured to set a result of the first hash-function to be at least a part of at least one of the following: the L3 network layer destination address, the destination address related to the protocol layer below the L3 network layer, and
    wherein the processor is yet further configured to set data, which is either of a part of or related to the entity to be accessed, to be at least a part of a payload data of the protocol data unit.

2. The network element according to claim 1, wherein the processor is configured to direct a second hash-function to a second data item that is a part of or related to a sub-entity of the entity to be accessed, and to set a result of the second hash-function to be a part of the destination address constituted partly by the result of the first hash-function.

3. The network element according to claim 1, wherein the processor is configured to set the result of the first hash-function to be at least a part of a destination address of an Ethernet data frame, the Ethernet protocol representing the protocol layer below the L3 network layer.

4. The network element according to claim 1, wherein the processor is configured to set the result of the first hash-function to be at least a part of a destination address of an Internet Protocol data packet, the Internet Protocol representing the L3 network layer.

5. The network element according to claim 1, wherein the processor is configured to direct a third hash-function to a third data item that is a part of or related to the entity to be accessed and to set a result of the third hash-function to be at least the part of the payload data of the protocol data unit, the result of the third hash-function containing more bits than the result of the first hash-function.

6. The network element according to claim 5, wherein the third data item is one of the following: the first data item, the second data item, a concatenation of the first and second data items.

7. The network element according to claim 1, wherein the processor is configured to direct a fourth hash-function to a fourth data item identifying the network element, and to set a result of the fourth hash-function to be at least a part of at least one of the following:
    L3 network layer source address of the protocol data unit, and
    a source address related to the protocol layer below the L3 network layer.

8. The network element according to claim 1, wherein the processor is configured to select one or more egress ports from among egress ports of the network element on the basis of the destination address constituted at least partly by the result of the first hash-function, and to control the selected one or more egress ports to transmit the protocol data unit to the data transfer network.

9. The network element according to claim 1, wherein the processor is configured to operate the network element as a part of a ring-shaped data transfer topology.

10. The network element according to claim 1, wherein the processor is configured to read the first data item from the protocol data unit in response to a situation in which the protocol data unit has been received from an external data transfer system.

11. A network element operational as a destination network element, the network element comprising:
    a data interface that receives a protocol data unit from a data transfer network; and
    a processor configured to:
        compare at least a part of a destination address of the received protocol data unit with first hash results, each of which being a result of a first hash-function directed to a first data item that is a part of or related to an entity of a plurality of entities accessible via the data transfer network, the destination address being one of the following: an L3 network layer destination address, and a destination address related to a protocol layer below the L3 network layer, and
        control, upon said comparing detecting a match between the at least a part of the destination address and at least one of the first hash results, the network element to provide access to the entity related to the first hash result matching with the destination address.

12. The network element according to claim 11, wherein the processor is configured to carry out the following actions in response to the match between the destination address and the one of the first hash results:
    comparing at least a part of the destination address of the received protocol data unit with second hash results each of which being a result of a second hash-function directed to a second data item that is a part of or related to a sub-entity of the entity related to the first hash result matching with the destination address, and
    controlling, in response to a match between the destination address and at least one of the second hash results, the network element to provide access to the sub-entity related to the second hash result matching with the destination address.

13. The network element according to claim 11, wherein the processor is configured to compare at least a part of a destination address of an Ethernet data frame with the first hash results, the protocol data unit being the Ethernet data frame.

14. The network element according to claim 11, wherein the processor is configured to compare at least a part of a destination address of an Internet Protocol data packet with the first hash results, the protocol data unit being the Internet Protocol data packet.

15. The network element according to claim 11, wherein the processor is configured to compare a data item contained by payload data of the protocol data unit with a third data item that is a part of or related to the entity to be accessed, and to invalidate the match between the destination address and the one of the first hash results in response to a situation where there is no match between the third data item and the data item contained by the payload data of the protocol data unit.

16. The network element according to claim 11, wherein the processor is configured to compare a data item contained by payload data of the protocol data unit with a third hash result that is a result of a third hash-function directed to a third data item that is a part of or related to the entity to be accessed, and to invalidate the match between the destination address and the one of the first hash results in response to a situation where there is no match between the third hash result and the data item contained by the payload data of the protocol data unit, the result of the third hash-function containing more bits than the result of the first hash-function.

17. The network element according to claim 15, wherein the third data item is one of the following: the first data item, the second data item, a concatenation of the first and second data items.

18. The network element according to claim 16, wherein the third data item is one of the following: the first data item, the second data item, a concatenation of the first and second data items.

19. The network element according to claim 11, wherein the processor is configured to carry out the following actions in response to the match between the destination address and the one of the first hash results:
    setting at least a part of the entity relating to the matched first hash result to be at least a part of payload data of another protocol data unit,
    setting a source address of the received protocol data unit to be a destination address of the other protocol data unit, and
    controlling the data interface to transmit the other protocol data unit to the data transfer network.

20. The network element according to claim 11, wherein the processor is configured to direct, in response to the match between the destination address and the one of the first hash results, a control action to the entity relating to the matched first hash result.

21. The network element according to claim 11, wherein the processor is configured to select, in response to the match between the destination address and the one of the first hash results, at least one egress port from among egress ports of the data interface on the basis of the matched first hash result and to control the selected one or more egress ports to forward the received protocol data unit to the data transfer network.

22. The network element according to claim 11, wherein the processor is configured to operate the network element as a part of a ring-shaped data transfer topology.

23. A method, comprising:
    directing a first hash-function to a first data item that is a part of or related to an entity to be accessed via a data transfer network;
    transmitting, from a first network element, a protocol data unit to the data transfer network so as to access to the entity via the data transfer network, the protocol data unit comprising at least one of the following destination addresses: an L3 network layer destination address, a destination address related to a protocol layer below the L3 network layer;
    setting a result of the first hash-function to be at least a part of at least one of the following: the L3 network layer destination address, the destination address related to the protocol layer below the L3 network layer;
    receiving, at a second network element, the protocol data unit from the data transfer network;
    comparing at least a part of the destination address of the received protocol data unit with first hash results each of which being a result of the first hash-function directed to a data item that is a part of or related to one of entities accessible via the data transfer network; and
    controlling, responsive to a match between the destination address and at least one of the first hash results being detected in said comparing step, the second network element to provide access to the entity related to the first hash result matching with the destination address.

24. The method according to claim 23, wherein the method comprises carrying out the following actions in response to the match between the destination address and the one of the first hash results:
    comparing at least a part of the destination address of the received protocol data unit with second hash results each of which being a result of a second hash-function directed to a second data item that is a part of or related to a sub-entity of the entity related to the first hash result matching with the destination address, and
    controlling, in response to a match between the destination address and at least one of the second hash results, the network element to provide access to the sub-entity related to the second hash result matching with the destination address.

25. The method according to claim 23, wherein the method further comprises:
    comparing a data item contained by payload data of the received protocol data unit with a third data item that is a part of or related to the entity to be accessed; and
    invalidating the match between the destination address and the one of the first hash results in response to a situation where there is no match between the third data item and the data item contained by the payload data of the received protocol data unit.

26. The method according to claim 23, wherein the method further comprises:
    comparing a data item contained by payload data of the protocol data unit with a third hash result that is a result of a third hash-function directed to a third data item that is a part of or related to the entity to be accessed; and
    invalidating the match between the destination address and the one of the first hash results in response to a situation where there is no match between the third hash result and the data item contained by the payload data of the protocol data unit, the result of the third hash-function containing more bits than the result of the first hash-function.

27. The method according to claim 23, wherein the entity to be accessed via the data transfer network is one of the following: a data file, a data element of a hierarchical data structure, a process to be controlled via the data transfer network, a device to be controlled via the data transfer network.

28. A non-transitory computer readable medium encoded with a computer program for controlling a network element suitable for operating as a source network element, the computer program comprising computer executable instructions for controlling a programmable processor, upon execution by said programmable processor, to:

direct a first hash-function to a first data item that is a part of or related to an entity to be accessed via a data transfer network; and control a data interface of the network element to transmit a protocol data unit to the data transfer network so as to access to the entity via the data transfer network;

the protocol data unit comprising at least one of the following destination addresses: an L3 network layer destination address, a destination address related to a protocol layer below the L3 network layer, wherein the computer program further comprises computer executable instructions for controlling the programmable processor to set a result of the first hash-function to be at least a part of at least one of the following: the L3 network layer destination address, the destination address related to the protocol layer below the L3 network layer, and wherein the computer program yet further comprises computer executable instructions for controlling the programmable processor to set data that is a part of or related to the entity to be accessed to be at least a part of payload data of the protocol data unit.

29. A non-transitory computer readable medium encoded with a computer program for controlling a network element suitable for operating as a destination network element, the computer program comprising computer executable instructions for controlling a programmable processor, upon execution by said programmable processor, to:

compare at least a part of a destination address of a protocol data unit with first hash results each of which being a result of a first hash-function directed to a first data item that is a part of or related to one of entities accessible via the data transfer network, the destination address being one of the following: an L3 network layer destination address, a destination address related to a protocol layer below the L3 network layer; and in response to a match between the at least a part of the destination address and at least one of the first hash results, control the network element to provide access to the entity related to the first hash result matching with the destination address.

* * * * *